BARTON & TOWLE.
Horse Rake.
No. 32,745.
Patented July 9, 1861.
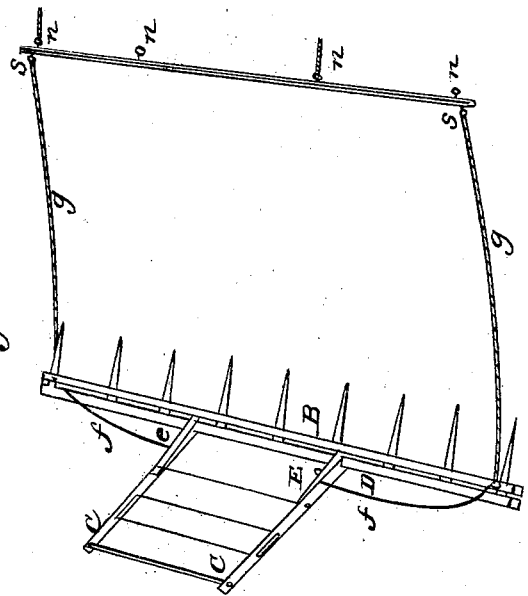
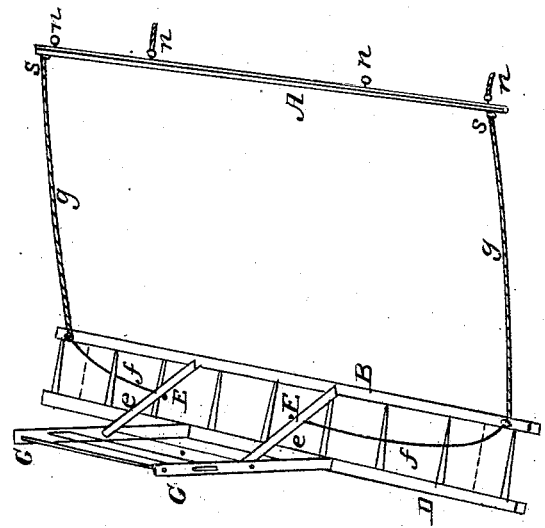

UNITED STATES PATENT OFFICE.

E. P. BARTON, OF BATAVIA, AND R. W. TOWLE, OF BATH, NEW YORK.

IMPROVEMENT IN HAY-RAKES.

Specification forming part of Letters Patent No. 32,745, dated July 9, 1861.

*To all whom it may concern:*

Be it known that we, ELLIOT P. BARTON, of the town of Batavia, county of Genesee, and State of New York, and RICHARD W. TOWLE, of the town of Bath, county of Steuben, and State aforesaid, have invented a new and useful Machine for Raking Hay, entitled a "Wagon Hay-Rake;" and we do hereby declare that the following is a full, clear, and exact description of the construction and operation of the same, reference being had to the annexed drawings, making a part of this specification, in which—

Figure 1 is a perspective view of the rake when in operation; Fig. 2, a view of the rake with the teeth drawn back.

Our invention relates to certain improvements of a hay-rake designed to be attached to and used in rear of a wagon, and so constructed that, when filled, by means of levers and other arrangements the rake may be withdrawn from the hay, permitting it to be pitched at once from before the rake upon the rear of the wagon, and the rake again thrown forward, reraking to its proper place without the backward or forward movement of the motive power.

The following is a description of its construction and operation.

We construct our rake principally of wood, and of the ordinary dimensions and proportions of other horse-rakes now in use, except, it being always drawn by a two horse-power, it may be made to rake wider. The tooth-head and teeth are made in the usual manner. The draft and fulcrum bar B is constructed with holes corresponding in number and size with the teeth in the head D, of the same length, and projecting one-half inch below to prevent the tooth-head D from coming in contact with the ground.

C C represent handles of the ordinary proportions, hinged upon the head D, and operating as levers resting upon the fulcrums E E. The standard-fulcrums E E are permanently attached at the bottom to the draft-bar B, falling against and directly inside the levers C C, and hinged thereto by the rod O. A hook and eye are set in front in the fulcrums E E, in which to carry the fork when raking.

F is a fender, and may be made of either wood or iron, to prevent the hay from falling over behind the rake. Ropes (see $g\,g$) are then permanently fastened to each end of the draft-bar B and the bar A, of sufficient length to afford ample room for pitching between the rake and wagon.

The bar A is made of nearly the same length as the rake, with rings $s\,s$, to which are fastened the ropes $g\,g$, and on the other side rings $n\,n\,n\,n$, to attach to ropes upon the wagon, and by means of which the rake may be drawn and used directly behind or at a given distance on either side of the wagon.

To use this rake we attach it to the rear of a wagon, with team and the usual rigging for drawing hay, by two short ropes or chains fastened to each end of the rear cross-bar of the rigging with hooks on one end connecting with rings $n\,n$ on bar A. When the rake is thus connected we cause the wagon to be drawn over the unraked hay, holding the rake by a rod passing through the top of the levers C C. When the rake, by being thus drawn forward, has become filled the wagon is stopped, the handles or levers C C are lifted, the short arm of which operating upon the head D the teeth are at once entirely withdrawn from the hay, which the holder of the rake, stepping forward, pitches immediately upon the wagon. Then, after replacing his fork in the hook and eye upon the front of the rake, he resumes his former position at the handles, which by pulling back again the teeth are projected forward, reraking to their former place, and ready to proceed again as before.

In using this rake a hand-rake to gather the scatterings by pitching and loading is dispensed with, and the services of two men only are required to drive the team, rake, pitch, and load, all of which may be done in the same time which otherwise with the hay previously raked would require three men.

What we claim, and desire to secure by Letters Patent, is—

The combination of the handles C C, hinged to the rake-head D, with the bar B and arms E E, when these parts are arranged and operated together in the manner and for the purpose specified.

ELLIOT P. BARTON.
RICHARD W. TOWLE.

Witnesses:
PAUL C. COOK,
A. BARTON.